Patented Dec. 24, 1935

2,025,677

UNITED STATES PATENT OFFICE 2,025,677

PROCESS FOR THE PREPARATION OF ORGANIC ACIDS

John C. Woodhouse, Wilmington, Del., assignor to E. I. du Pont de Nemours & Company, Wilmington, Del., a corporation of Delaware No Drawing. Application October 25, 1932, Serial No. 639,484

12 Claims. (Cl. 260—116)

This invention relates to the synthesis of organic compounds and particularly to the preparation of higher aliphatic acids by the interaction of olefines, carbon monoxide, and steam.

In the copending application of Gilbert B. Carpenter Ser. No. 559,130, a process is described for the preparation of aliphatic carboxylic acids of the higher order by the reaction of steam, carbon monoxide, and an olefinic hydrocarbon, i. e. an aliphatic hydrocarbon containing a double bond,—for example, the olefines, ethylene, propylene, butylene, etc.,—the synthesis producing from these olefines propionic, butyric, and valeric acids respectively, and the diolefines, e. g. isoprene to trimethyl succinic acid and 1.4 penta diene to symmetrical dimethyl glutaric acid. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a halogenated aliphatic acid catalyst in the presence or absence of an absorbent material such as pumice, silica gel, active carbon, etc. Another object of the invention is to provide a process for the preparation of acids having the structural formula—

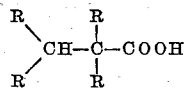

from steam, carbon monoxide, and an olefinic hydrocarbon, the R indicating hydrogen or a substituted or unsubstituted similar or dissimilar alkyl or aralkyl grouping. Other objects and advantages will hereinafter appear.

In accord with the present invention aliphatic carboxylic acids can be prepared from steam, carbon monoxide, and an olefinic hydrocarbon by passing these constituents, in the presence of a halogenated organic or a halogenated derivative of an organic acid, under suitable temperature and pressure conditions, over active carbon, and more particularly over activated charcoal. The products resulting from such a reaction will contain generally a mixture of aliphatic carboxylic acids some of which have a greater, some a lesser, number of carbon atoms than are present in the olefine treated,—an aliphatic acid containing one more carbon atom than the olefine treated usually predominating.

The halogenated organic acids which I generally prefer to use correspond to the acid which it is desired to synthesize. For example, if propionic acid is being made from ethylene, carbon monoxide, and steam, I prefer to use a chlorpropionic acid, such as the mono-chlor-propionic acid, as the catalyst; while if propylene, CO, and steam are being reacted to give butyric acid, the chlor-butyric acid would be the preferred catalyst. This, however, is not an invariable rule for a halogenated organic acid or derivative thereof other than a homologue of the acid to be prepared may be used. The acids containing one or more halogen atoms are suitable catalysts, for example the mono-, di-, or tri-chlor acetic, propionic, or butyric acids or the higher halogenated derivatives of these or homologous unsaturated acids. The halogenated derivatives of the organic acids include the acyl halides of the organic acids such as acetyl chloride, propionyl chloride, etc.; any of the halogenated organic acids, esters, or derivatives thereof and especially the acyl halides catalyze the reaction and are particularly active when used in conjunction with a form of active carbon.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable byproducts, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate methods of practising the invention, although the invention is not limited to the examples:

*Example 1.*—A gaseous mixture is prepared containing by volume 95% carbon monoxide, and 5% ethylene, together with steam to give a steam: carbon monoxide and ethylene ratio of approximately 0.25. Into this mixture is injected an appropriate amount of monochlor-propionic acid to give a mixture containing approximately 2% of this catalyst. The resulting gaseous mixture is passed into a conversion chamber designed for carrying out exothermic gaseous reactions and in which activated charcoal is disposed. The temperature of the reaction is maintained at approximately 325° C. while the pressure is held at approximately 700 atmospheres. A good yield of propionic acid may be obtained together with other aliphatic acids when operating under these conditions.

*Example 2.*—A gaseous mixture containing by volume 94% carbon monoxide, 5% propylene, and 1% tri-chlor-isobutyric acid, together with steam, to give a steam : carbon monoxide and propylene ratio of approximately 0.25, is passed into a conversion chamber designed for carrying out gaseous exothermic reactions and in which activated charcoal has been disposed. At a temperature of approximately 325° C. and a pressure of 700 atmospheres a good yield of iso-butyric acid will be obtained.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the method described hereinbefore without departing from the invention or sacrificing the advantages thereof.

I claim:

1. A process for the preparation of aliphatic carboxylic acids from steam, carbon monoxide, and an olefinic hydrocarbon, which includes the step of effecting the reaction in the presence of a catalyst selected from the group consisting of an aliphatic acyl halide, a halogenated aliphatic monocarboxylic acid, and a halogented aliphatic monocarboxylic ester.

2. A process for the preparation of aliphatic carboxylic acids from steam, carbon monoxide, and an olefinic hydrocarbon, which includes the step of effecting the reaction in the presence of a catalyst selected from the group consisting of an aliphatic acyl halide, a halogenated aliphatic monocarboxylic acid, and a halogenated aliphatic monocarboxylic ester, and active carbon.

3. A process for the preparation of aliphatic carboxylic acids from steam, carbon monoxide, and an olefinic hydrocarbon, which includes the step of effecting the reaction in the presence of a halogenated aliphatic monocarboxylic acid.

4. A process for the preparation of aliphatic carboxylic acids from steam, carbon monoxide, and an olefinic hydrocarbon, which includes the step of effecting the reaction in the presence of a halogenated aliphatic monocarboxylic acid and active carbon.

5. A process for the preparation of aliphatic carboxylic acids from steam, carbon monoxide, and an olefinic hydrocarbon, which includes the step of effecting the reaction in the presence of a halogenated aliphatic monocarboxylic acid.

6. A process for the preparation of aliphatic carboxylic acids from steam, carbon monoxide, and an olefine, which includes the step of effecting the reaction in the presence of a halogenated aliphatic monocarboxylic acid.

7. A process for the preparation of aliphatic carboxylic acids from a gaseous mixture containing steam, carbon monoxide, and an olefinic hydrocarbon, which comprises passing the gaseous mixture together with a catalyst selected from the group consisting of an aliphatic acyl halide, a halogenated aliphatic monocarboxylic acid, and a halogenated aliphatic monocarboxylic ester over active carbon.

8. A process for the preparation of aliphatic carboxylic acids from a gaseous mixture containing steam, carbon monoxide, and an olefinic hydrocarbon, which comprises passing the gaseous mixture together with a catalyst selected from the group consisting of an aliphatic acyl halide, a halogenated aliphatic monocarboxylic acid, and a halogenated aliphatic monocarboxylic ester over activated charcoal.

9. A process for the preparation of aliphatic carboxylic acids from steam, carbon monoxide, and an olefinic hydrocarbon, which includes the step of effecting the reaction in the presence of a halogenated aliphatic monocarboxylic acid and active carbon, the halogenated aliphatic monocarboxylic acid being similar to the aliphatic carboxylic acid product of the reaction.

10. A process for the preparation of propionic acid from a gaseous mixture containing steam, carbon monoxide, and ethylene, which comprises passing the gaseous mixture together with a chlor-propionic acid over activated charcoal.

11. A process for the preparation of butyric acid from a gaseous mixture containing steam, carbon monoxide, and propylene, which comprises passing the gaseous mixture together with a chlor-butyric acid over activated charcoal.

12. A process for the preparation of valeric acid from a gaseous mixture containing steam, carbon monoxide, and butylene, which comprises passing the gaseous mixture together with a chlor-valeric acid over activated charcoal.

JOHN C. WOODHOUSE.